(12) United States Patent
Nagai et al.

(10) Patent No.: US 6,178,837 B1
(45) Date of Patent: Jan. 30, 2001

(54) ELECTRIC ACTUATOR

(75) Inventors: Shigekazu Nagai, Tokyo; Shuuzou Sakurai, Funabashi, both of (JP)

(73) Assignee: SMC Kabushiki Kaisha, Tokyo (JP)

( * ) Notice: Under 35 U.S.C. 154(b), the term of this patent shall be extended for 0 days.

(21) Appl. No.: 09/331,186

(22) PCT Filed: Dec. 24, 1997

(86) PCT No.: PCT/JP97/04795

§ 371 Date: Jun. 24, 1999

§ 102(e) Date: Jun. 24, 1999

(87) PCT Pub. No.: WO98/29674

PCT Pub. Date: Jul. 9, 1998

(30) Foreign Application Priority Data

Dec. 25, 1996  (JP) .................................. 8-346322

(51) Int. Cl.[7] ........................................ F16H 29/20
(52) U.S. Cl. ........................... 74/89.15; 74/424.8 R
(58) Field of Search ................ 74/89.15, 424.8 R, 74/499, 441; 310/83, 112

(56) References Cited

U.S. PATENT DOCUMENTS

| | | | |
|---|---|---|---|
| 3,682,283 | * | 8/1972 | Sato ........................ 192/141 |
| 4,082,247 | * | 4/1978 | Dalton ..................... 251/229 |
| 4,635,491 | * | 1/1987 | Yamano et al. .......... 74/89.15 |
| 4,739,669 | * | 4/1988 | Yokose et al. ........... 74/89.15 |
| 5,090,513 | * | 2/1992 | Bussinger ................ 192/141 |
| 5,269,343 | * | 12/1993 | Trapp ...................... 137/554 |
| 5,346,045 | * | 9/1994 | Bennett et al. .......... 192/141 |
| 5,809,831 | * | 9/1998 | Nagai et al. ............. 74/89.15 |

FOREIGN PATENT DOCUMENTS

| | | |
|---|---|---|
| 45-26519 | 10/1970 | (JP) . |
| 48-21746 | 6/1973 | (JP) . |
| 56-28845 | 7/1981 | (JP) . |
| 58-101041 | 7/1983 | (JP) . |
| 3-23306 | 3/1991 | (JP) . |

* cited by examiner

Primary Examiner—Charles A. Marmor
Assistant Examiner—Saúl Rodriguez
(74) Attorney, Agent, or Firm—Oblon, Spivak, McClelland, Maier & Neustadt, P.C.

(57) ABSTRACT

An electric actuator comprises a main actuator body 12, a driving unit 16, a feed screw shaft 32 for transmitting rotary driving force of a rotary driving source 14, a displacement member 40 for externally fitting and surrounding the feed screw shaft 32 to make displacement along the axial direction in accordance with the engaging action between a male thread 36 and a female thread 42, sensor attachment long grooves 24a, 24b provided at side surface portions of the main actuator body 12, and sensors 25 installed at predetermined portions in the sensor attachment long grooves 24a, 24b.

10 Claims, 8 Drawing Sheets

ELECTRIC ACTUATOR

TECHNICAL FIELD

The present invention relates to an electric actuator which functions, for example, as a transport mechanism for a workpiece by transmitting the rotary driving force of a rotary driving source to a displacement member by the aid of a driving force-transmitting means.

BACKGROUND ART

The electric actuator has been hitherto used, for example, as a means for transporting a workpiece. As shown in FIGS. 9 and 10, such an electric actuator comprises a lengthy frame 1 formed with an opening to function as a main actuator body, and a block-shaped electric motor 2 secured to one end of the frame 1. The electric actuator includes a ball screw 3 and a motor shaft of the electric motor 2 which are coaxially coupled to one another by using an unillustrated coupling member. A movable member 4 is fixed to an unillustrated nut member which is engaged with the ball screw 3.

Long grooves 5a, 5b, which are provided for attaching sensors, are formed on a side surface of the flame 1 along the longitudinal direction of the frame 1. The sensor 6 is installed to a predetermined portion of the long groove 5a, 5b. A lead wire 7, which is electrically connected to the sensor 6, is led into the long groove 5a, 5b. One end of the lead wire 7 is connected to an external equipment such as a controller. A detection signal, which is detected by the sensor 6, is inputted into the external equipment.

A part of the opening of the frame 1 is closed with a cover plate 8. Slits 9a, 9b are formed at the remaining portions which are not closed with the cover plate 8 (see FIG. 10). The slits 9a, 9b communicate with the outside, and they are formed along the axial direction of the frame 1.

In this arrangement, the nut member, which is engaged with the ball screw 3, is linearly displaced along the slits 9a, 9b in accordance with the driving action of the electric motor 2. Thus, the movable member 4, which is fixed to the nut member, is displaced in an integrated manner.

However, in the case of the electric actuator concerning the conventional technique described above, the slits 9a, 9b, which serve as the space for moving the nut member, are formed at the opening of the frame 1. Therefore, any dust or the like enters the inside of the frame 1 from the outside via the slits 9a, 9b, and it adheres to the ball screw 3. As a result, an inconvenience arises in that the driving force-transmitting function of the ball screw 3 is lowered, and it becomes impossible to allow the movable member 4 to make smooth reciprocating motion.

Further, for example, any maintenance work is performed, the following inconvenience arises. That is, an operator contacts with the lead wire 7 exposed from the long groove 5a, 5b to the outside, and the lead wire is hitched thereby. As a result, the position of the sensor 6 having been installed at the predetermined portion of the long groove 5a, 5b is deviated.

An object of the present invention is to provide an electric actuator which makes it possible to prevent the inside of the main actuator body from invasion of dust or the like so that any decrease in the driving force-transmitting function is avoided, and which makes it possible to avoid any positional deviation of the sensor, which would be otherwise caused by the stretching action effected on the lead wire.

DISCLOSURE OF THE INVENTION

According to the present invention, a rotary driving force-transmitting member, which is operated in accordance with the driving action of a rotary driving source, is doubly surrounded by a displacement member and a main actuator body. Therefore, it is possible to avoid adhesion of dust or the like to the rotary driving force-transmitting member.

Further, according to the present invention, a sensor is attached to a predetermined portion in a long groove provided on a side surface of the main actuator body. The sensor detects the magnetic field of a permanent magnet which makes displacement integrally with the displacement member. Thus, it is possible to detect the amount of displacement of the displacement member.

BEST MODE FOR CARRYING OUT THE INVENTION

Figure 1:
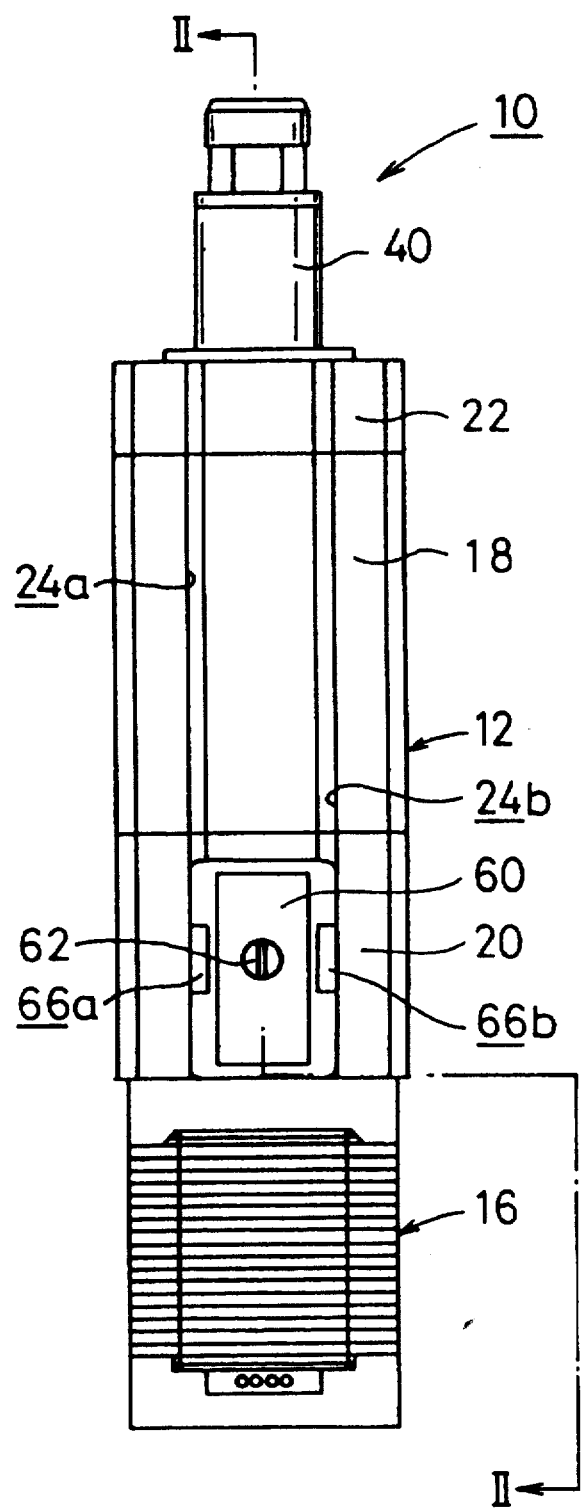
FIG. 1 shows a front view illustrating an electric actuator according to an embodiment of the present invention.
Figure 2:
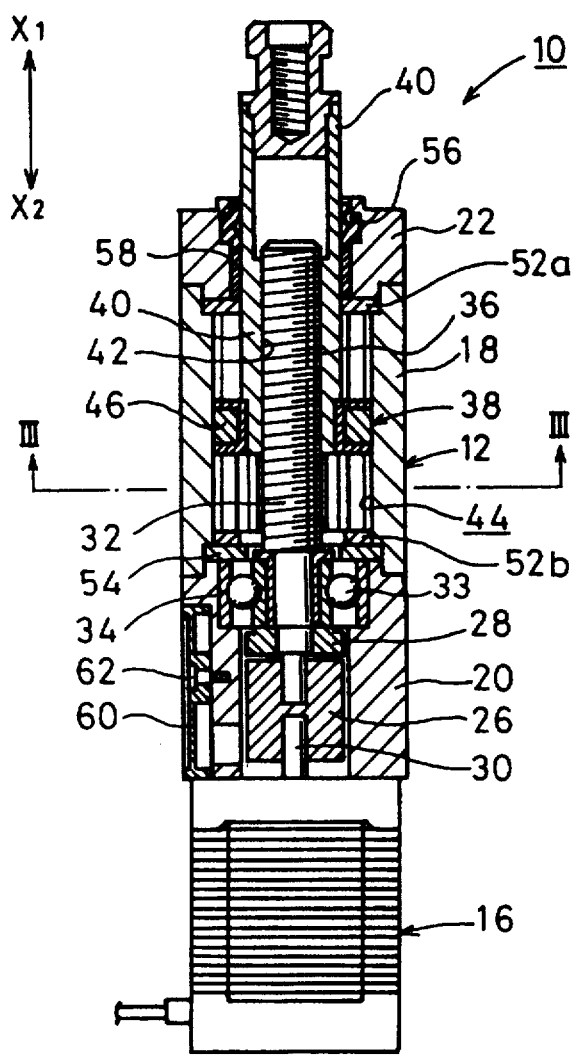
FIG. 2 shows a longitudinal sectional view taken along a line II—II shown in FIG. 1.

With reference to FIGS. 1 and 2, reference numeral 10 indicates an electric actuator according to an embodiment of the present invention. The electric actuator 10 comprises a main actuator body 12 having a hollow rectangular parallelepiped-shaped configuration and including a through-hole formed along the axial direction, and a driving unit 16 formed to be substantially flush with the side surface of the main actuator body 12 and arranged with a rotary driving source 14 (see FIG. 4).

The main actuator body 12 comprises a first body 18 and a second body 20 each of which has a hollow rectangular parallelepiped-shaped configuration and each of which is formed to have its flush side surface, and a head cover 22 which is coupled to one end of the first body 18. A pair of sensor attachment long grooves 24a, 24b each having a circular arc-shaped configuration are formed substantially in parallel to one another on each of two opposing side surfaces of the first body 18, the second body 20, and the head cover 22 respectively (see FIG. 3). Columnar sensors 25 are installed at predetermined portions of the sensor attachment long grooves 24a, 24b (see FIG. 3). The position of the piston can be detected by detecting the magnetic field of a permanent magnet which is installed to the piston to be moved therewith in an integrated manner as described later on.

As shown in FIG. 2, a feed screw shaft (rotary driving force-transmitting member) 32, which is coaxially coupled to a driving shaft 30 of the rotary driving source 14 by the aid of a coupling member 26 and a lock nut 28, is provided at the inside of the second body 20 coupled to the driving unit 16. The feed screw shaft 32 is rotatably supported by a first bearing member 34 provided with a ball bearing 33. A male thread 36 is threaded over a predetermined portion on the outer circumferential surface of the feed screw shaft 32. A displacement member 40 having a piston 38 is externally fitted to the feed screw shaft 32. A female thread 42, which is formed on the inner circumferential surface of the displacement member 40, is engaged with the male thread 36 formed on the outer circumferential surface of the feed screw shaft 32. Therefore, the displacement member 40 is displaced in the direction indicated by the arrow $X_1$ or $X_2$ in accordance with the engaging action of the feed screw shaft 32.

It is advantageous that the production can be performed inexpensively when the first body 18 and the piston 38 are formed by means of aluminum extrusion forming or resin molding.

The piston 38, which makes sliding displacement along a hole 44 of the first body 18, is provided at one end of the cylindrical displacement member 40. A permanent magnet 46 is fitted to the piston 38 by the aid of an annular groove. A spline 48 is formed on the outer circumferential surface of the piston 38. A spline groove 50 corresponding to the spline 48 is formed on the inner wall surface of the hole 44 of the first body 18 on which the piston 38 makes the sliding movement (see FIG. 3). The rotation-preventive function is effected for the displacement member 40 by the displacement of the piston 38 along the hole 44 in accordance with the guiding action of the spline groove 50.

The sensor 25, which is installed to the sensor attachment long groove 24a, 24b, detects the magnetic field of the permanent magnet 46 which is displaced integrally with the piston 38. Thus, it is possible to detect the position of the piston 38. A pair of damper members 52a, 52b, which regulate the displacement terminal position and mitigate the shock upon abutment against the piston 38, are arranged at both ends of the first body 18 respectively. A spacer 54 is interposed between the first bearing member 34 and the damper member 52b.

The head cover 22 is provided with a rod packing 56 for surrounding the displacement member 40 to prevent the inside of the hole 44 of the first body 18 from invasion of dust or the like, and a bush 58 for making the guiding action when the displacement member 40 is displaced in the direction of the arrow $X_1$ or $X_2$.

Figure 5:
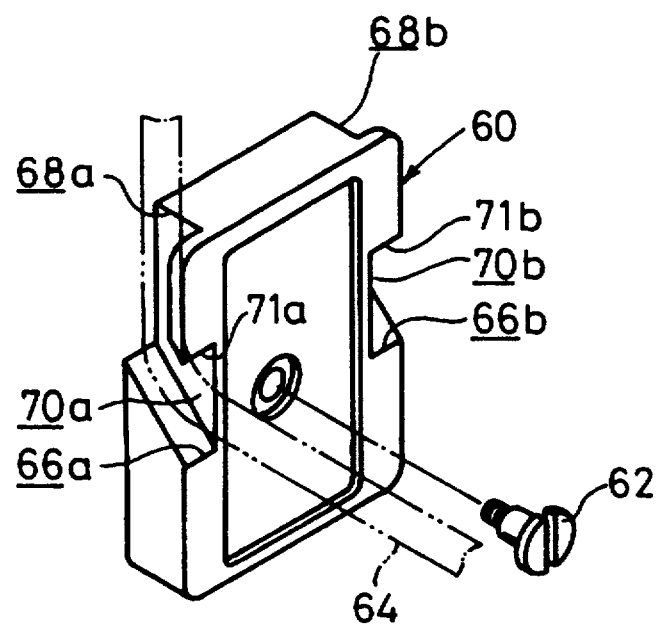
FIG. 5 shows a perspective view illustrating a cover member for constructing the electric actuator shown in FIG. 1.

As shown in FIG. 5, an oblong cover member 60 is detachably attached to a side surface portion of the second body 20 by the aid of a screw 62. The cover member 60 is provided with a pair of lead wire outlets 66a, 66b which communicate with the sensor attachment long grooves 24a, 24b and which are provided for externally leading the lead wires 64 coming from the sensors 25.

That is, the cover member 60 is formed with a pair of first holes 68a, 68b which extend coaxially with the sensor attachment long grooves 24a, 24b. The cover member 60 is further formed with a pair of second holes 70a, 70b which are bent externally by a predetermined angle from the first holes 68a, 68b. Fastening tabs 71a, 71b each having an acute angular configuration for fastening the lead wire 64 are formed at the outlets 66a, 66b.

In this embodiment, the sensor 25 is installed at the predetermined portion of the sensor attachment long groove 24a, 24b of the main actuator body 12. The lead wire 64, which is led internally along the sensor attachment long groove 24a, 24b, is bent along the first hole 68a, 68b and the second hole 70a, 70b. The lead wire 64 is fastened at its predetermined portion by using the fastening tab 71a, 71b provided at the lead wire outlet 66a, 66b. Thus, the lead wire 64 is held by the cover member 60.

Figure 4:
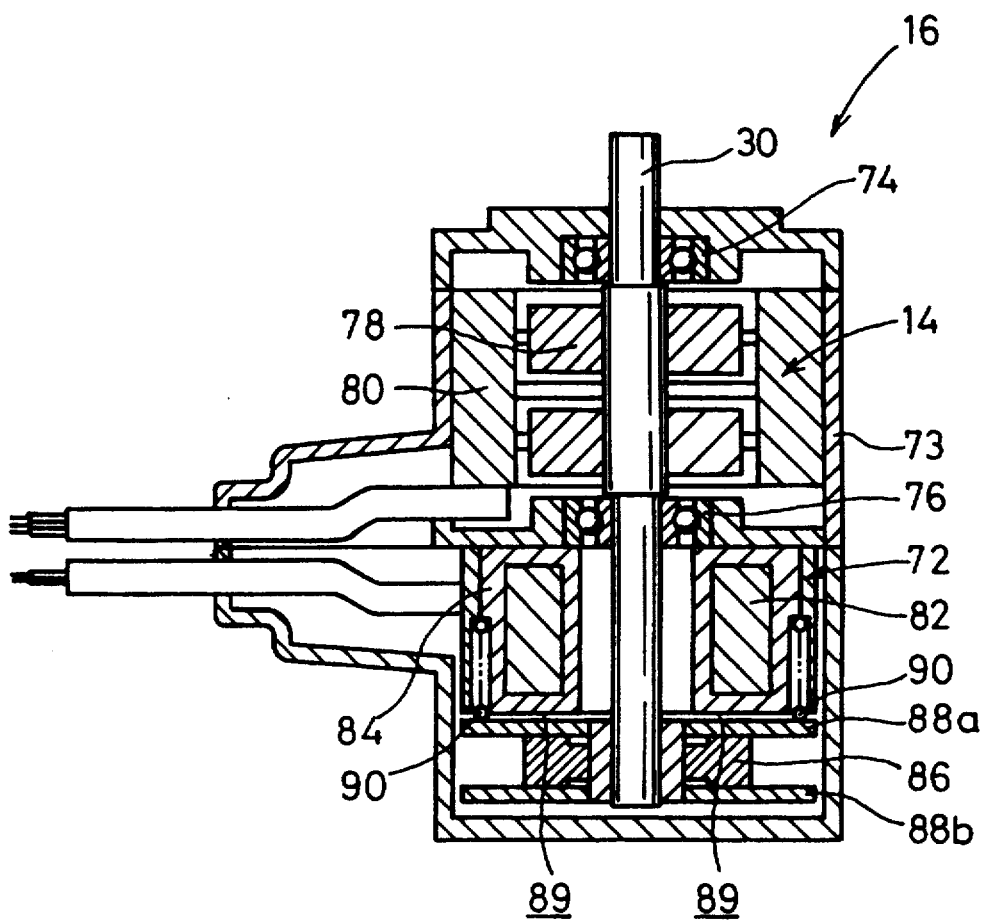
FIG. 4 shows a longitudinal sectional view illustrating a driving unit for constructing the electric actuator shown in FIG. 1.

As shown in FIG. 4, the driving unit 16 comprises the rotary driving source 14 and a brake mechanism 72, and it is accommodated in a housing 73. The driving shaft 30 of the rotary driving source 14 is rotatably supported by a second bearing member 74 and a third bearing member 76 which are separated from each other by a predetermined spacing distance. The terminal end of the driving shaft 30 extends up to the brake mechanism 72. The rotary driving source 14 includes a rotor 78 which is fixed to the driving shaft 30 to make rotation integrally with the driving shaft 30, and a stator 80 which is fixed to the housing 73.

The brake mechanism 72 includes a casing 84 which is arranged with an electromagnetic coil 82, and a braking pad 86 which is provided at the outside of the casing 84 and which is rotated integrally with the driving shaft 30. A pair of interposing plates 88a, 88b are provided and aligned with the braking pad 86 intervening therebetween. The first interposing plate 88a is provided to be pressed toward the second interposing plate 88b by the aid of the resilient force of a spring member 90 fastened to a recess of the casing 84. Therefore, the braking pad 86 is interposed and held at its both surfaces by using the pair of interposing plate 88a, 88b in accordance with the action of the resilient force of the spring member 90. Thus, the braking action is effected to stop the rotation of the driving shaft 30. A gap 89 having a predetermined clearance is formed between the first interposing plate 88a and the casing 84 which surrounds the electromagnetic coil 82.

The first interposing plate 88a, on which the pressing force is exerted by the spring member 90, is provided displaceably along the axial direction of the driving shaft 30. When the electric power is applied to the electromagnetic coil 82 to give the ON state starting from the state shown in FIG. 4, the first interposing plate 88a is attracted toward the electromagnetic coil 82 while overcoming the resilient force of the spring member 90. As a result, the braking action is deenergized, and the driving shaft 30 is rotated in the predetermined direction.

The electric actuator 10 according to the embodiment of the present invention is basically constructed as described above. Next, its operation, function, and effect will be explained.

At first, the pair of sensors 25 are installed to the predetermined portions in the sensor attachment long grooves 24a, 24b. Subsequently, the lead wires 64, which are connected to the sensors 25 are led internally along the sensor attachment long grooves 24a, 24b, and they are installed along the first holes 68a, 68b and the second holes 70a, 70b of the cover member 60. The lead wires 64 are led externally from the lead wire outlets 66a, 66b.

In this arrangement, the lead wires 64 are bent by the second holes 70a, 70b which are inclined at the predetermined angle in the cover member 60. The lead wires 64 are fastened by the fastening tabs 71a, 71b provided at the lead wire outlets 66a, 66b. Therefore, as described later on, even when an operator erroneously contacts with the lead wire 64, the lead wire 64 is hitched thereby, then the sensor 25 can be prevented from any deviation of position of the sensor which would be otherwise caused by the stretching action effected on the lead wire 64, because the lead wire 64 is fastened by the cover member 60.

Subsequently, when the unillustrated power source is energized, the rotary driving source 14 makes rotational driving. The rotary driving force of the rotary driving source 14 is transmitted via the coupling member 26 to the feed screw 32 which is coaxially coupled thereto. The displacement member 40 is displaced in the direction indicated by the arrow $X_1$ or $X_2$ in accordance with the engaging action between the male thread 36 of the feed screw shaft 32 and the female thread 42 formed on the inner circumferential surface of the displacement member 40.

During this process, the spline 48, which is formed on the outer circumferential surface of the piston 38, effects the rotation-preventive function for the displacement member 40. Further, the guiding action is exhibited by the bush 58 provided for the head cover 22 and the first bearing member 34 provided for the second body 20 respectively.

The piston 38 abuts against one of the damper members 52a (52b) during the displacement process in which the displacement member 40 is displaced in the direction of the arrow $X_1$ ($X_2$) in accordance with the engaging action of the feed screw shaft 32. Thus, the displacement terminal position is restricted, and the shock upon the abutment is absorbed.

On the other hand, the displacement member 40 is displaced in the direction of the arrow $X_2$ ($X_1$), and it is restored to the original position, by rotating the rotary driving source 14 in the direction opposite to the above by using an unillustrated switching means.

In the embodiment of the present invention, the sensors 25 are conveniently installed to the predetermined portions of the sensor attachment long grooves 24a, 24b formed on the side surface of the main actuator body 12. Accordingly, it is possible to detect the displacement amount of the displacement member 40.

In the embodiment of the present invention, the feed screw shaft 32, which is coaxially coupled to the driving shaft 30 of the rotary driving source 14 by the aid of the coupling member 26, is doubly surrounded by the main actuator body 12 and the displacement member 40 externally fitted to the feed screw shaft 32. Accordingly, it is possible to avoid the feed screw shaft 32 from adhesion of dust or the like.

Therefore, it is possible to improve the durability by avoiding the increase in sliding resistance of the feed screw shaft 32, which would be otherwise caused by adhesion of dust or the like to the feed screw shaft 32. Further, the rotary driving force of the rotary driving source 14 can be smoothly transmitted to the displacement member 40.

Further, in the embodiment of the present invention, the lead wires 64 are inserted along the first holes 68a, 68b and the second holes 70a, 70b provided on the cover member 60, and the parts of the lead wires 64 are fastened by the cover member 60. Accordingly, for example, if an operator contacts the lead wire 64 exposed to the outside from the sensor attachment long groove 24a, 24b, and the lead wire 64 is hitched thereby upon the execution of maintenance operation, then it is possible to avoid the deviation of the position of the sensor 25, which would be otherwise caused by the stretching action effected on the lead wire 64, because the part of the lead wire 64 is fastened by the cover member 60.

The embodiment of the present invention adopts the arrangement in which the lead wire 64 is led to the outside via the lead wire outlet 66a, 66b provided for the cover member 60, which is advantageous in that the lead wire 64 is prevented from any contact with the driving unit 16, and it is possible to avoid any damage of the lead wire 64 which would be otherwise caused by the release of heat generated during the driving operation of the driving unit 16.

Figure 3:
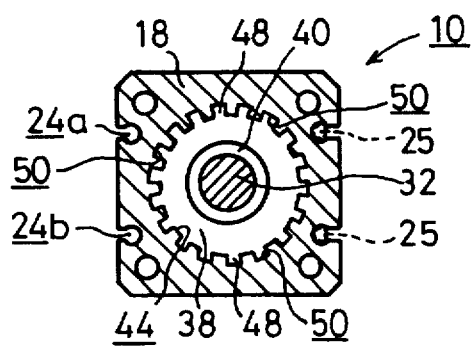
FIG. 3 shows a sectional view taken along a line III—III shown in FIG. 2.
Figure 6:
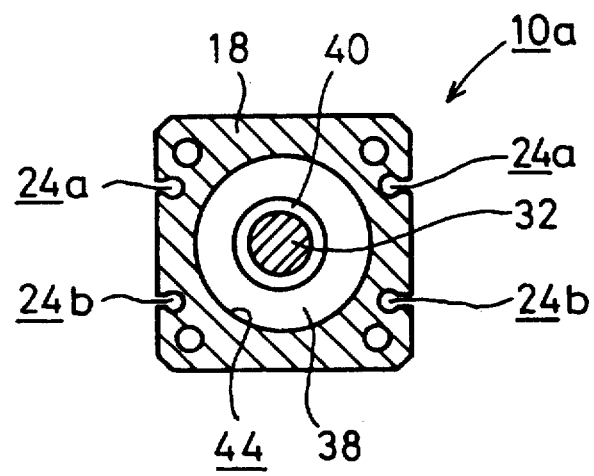
FIG. 6 shows a sectional view illustrating an electric actuator according to another embodiment of the present invention.

Next, an electric actuator 10a according to another embodiment of the present invention is shown in FIG. 6. The electric actuator 10a differs in the following points. That is, the electric actuator 10a does not include the rotation-preventive means such as the spline 48 and the spline groove 50 as shown in FIG. 3. Cross-sectional configurations of the outer circumferential surfaces of the piston 38 and the hole 44 of the first body 18 are formed to be circular respectively. Another member (as described later on), which is externally provided in an additional manner, is used to exhibit the rotation-preventive function for the displacement member 40. It is noted that the same constitutive components as those of the electric actuator 10 shown in FIG. 1 are designated by the same reference numerals, detailed explanation of which will be omitted.

Figure 7:
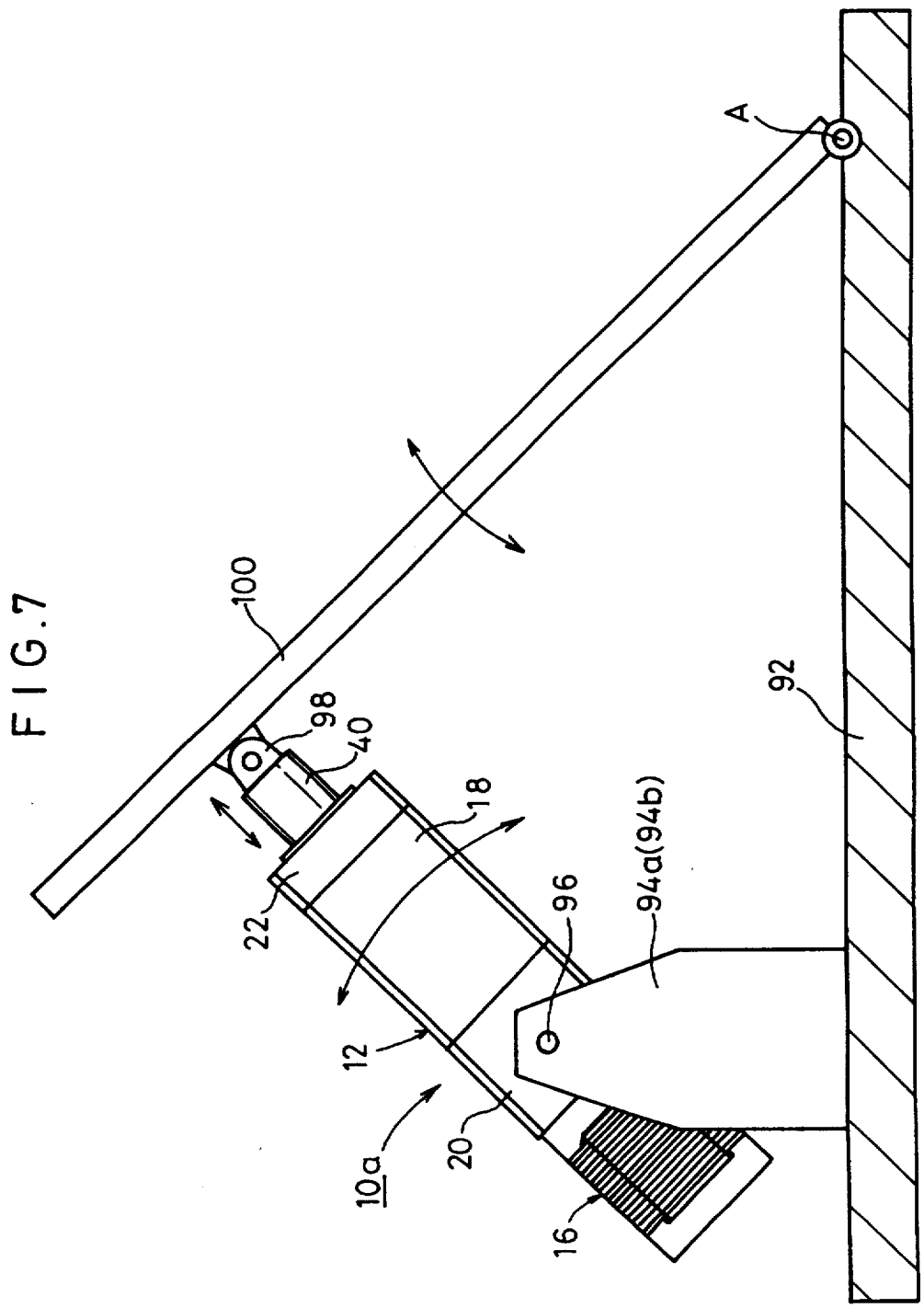
FIG. 7 illustrates a schematic arrangement depicting a state in which the electric actuator shown in FIG. 6 is assembled to another member.

A specified example, in which the electric actuator 10a according to the another embodiment is used, is shown, for example, in FIG. 7. A pair of support pillars 94a, 94b are fixed on a base plate 92. A pin member 96, which is supported between the pair of support pillars 94a, 94b, is used as the center of rotation to support the electric actuator 1a rotatably in the directions indicated by the arrows. A coupling member 98, which is connected to one end of the displacement member 40, is used to support a flat plate 100. In this embodiment, the displacement member 40 makes forward and backward movement in the directions indicated by the arrows in accordance with the driving action of the electric actuator 10a. Accordingly, the plate 100 can be displaced rotationally by a predetermined angle by using the point A as the center of rotation.

Figure 8:
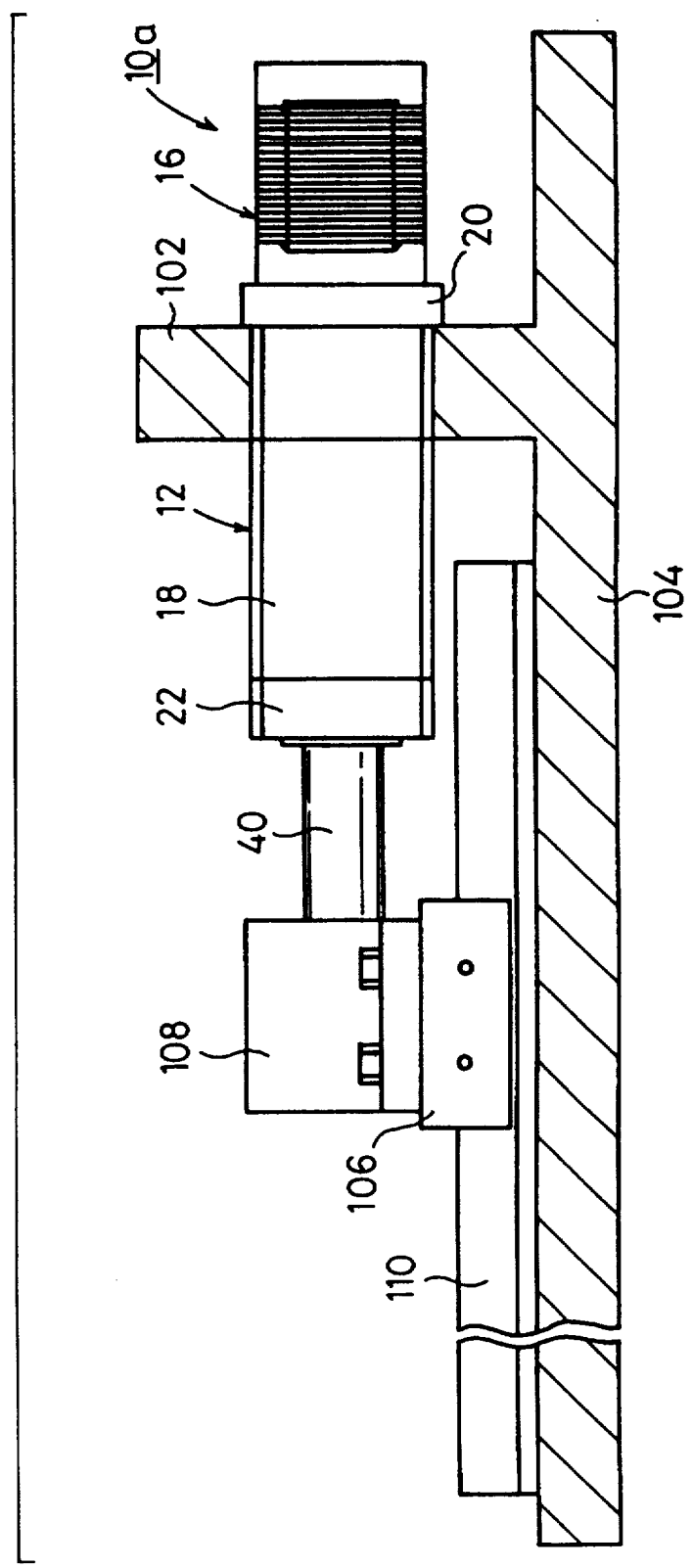
FIG. 8 illustrates a schematic arrangement depicting a state in which the electric actuator shown in FIG. 6 is assembled to still another member.
Figure 9:
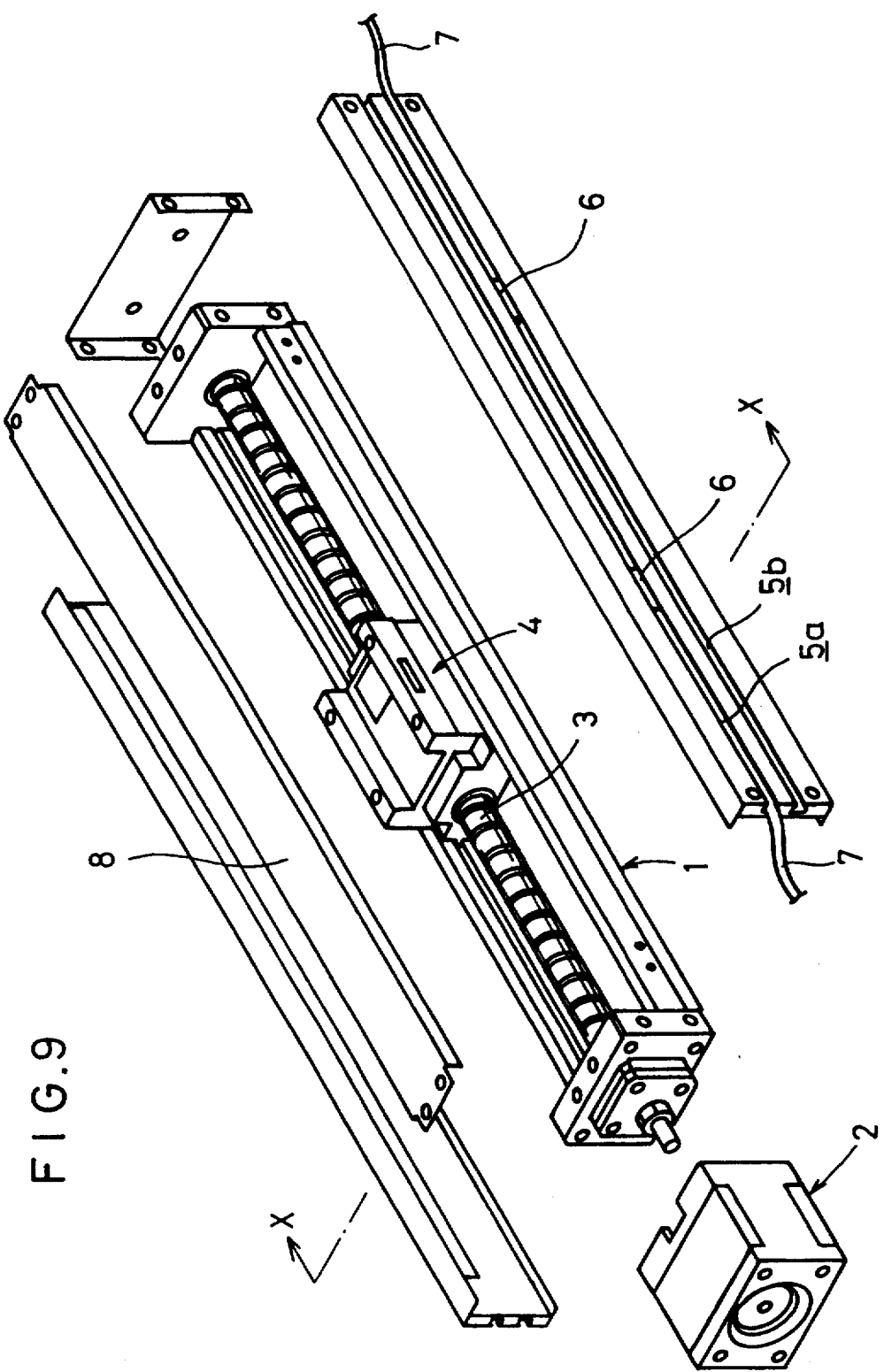
FIG. 9 shows an exploded perspective view illustrating an electric actuator concerning the conventional technique.
Figure 10:
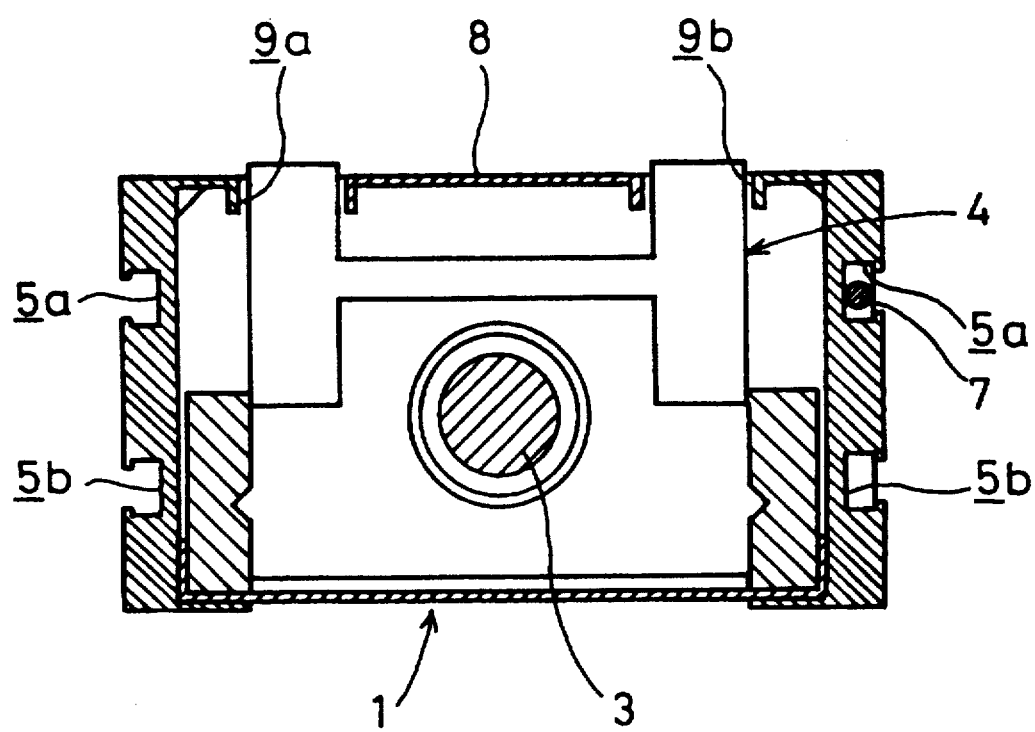
FIG. 10 shows a sectional view taken along a line X—X shown in FIG. 9.

Alternatively, as shown in FIG. 8, a support block 102 is used to hold the electric actuator 10a substantially in parallel to a base plate 104. A flange 108 is fastened by screws to a linear guide 106 fixed on the base plate 104. The flange 108 is coupled to one end of the displacement member 40. As a result, the displacement member 40 and the flange 108 are displaced in an integrated manner in accordance with the guiding action of a linear guide rail 110.

As described above, in the case of the electric actuator 10a according to the another embodiment, the displacement member 40 is prevented from rotation by means of the another additional member such as the guide member. Accordingly, it is unnecessary to provide any rotation-preventive means for the displacement member 40. Therefore, the arrangement described above is advantageous in that the processing operation is simplified, and it is possible to reduce the production cost.

Either sharp edge or burr, which is produced during the production steps, is attached to the outer circumferential surface of the feed screw shaft 32 in some cases. It is feared that the sharp edge and the burr may cause any damage on the engaging portion between the feed screw shaft 32 and the displacement member 40, and the smooth rotational operation may be disturbed.

In such a case, the feed screw shaft 32 is processed, and then the thread portion of the feed screw shaft 32 is subjected to, for example, chemical polishing, electropolishing, or shot peening. Accordingly, the sharp edge, the burr, the processing scratch and the like can be removed. Further, the surface treatment such as the Tufftride treatment and the electroless plating treatment may be applied to the outer surface of the feed screw shaft 32. Such a treatment is advantageous in that the sliding performance can be further improved.

INDUSTRIAL APPLICABILITY

According to the present invention, the rotary driving force-transmitting member is doubly surrounded by the displacement member and the main actuator body. Accordingly, it is possible to prevent the rotary driving force-transmitting member from any adhesion of dust or the like.

Therefore, it is possible to improve the durability by avoiding the increase in sliding resistance of the rotary driving force-transmitting member, which would be otherwise caused by the adhesion of the dust or the like to the rotary driving force-transmitting member. Further, it is possible to smoothly transmit the rotary driving force of the rotary driving source to the displacement member.

Further, the lead wire is fastened by the cover member. Therefore, it is possible to avoid the deviation of the position of the sensor, which would be otherwise caused by the stretching action effected on the lead wire.

What is claimed is:

1. An electric actuator comprising:

a cylindrical main actuator body;

a rotary driving source which is arranged in a driving unit disposed beside said main actuator body;

a rotary driving force-transmitting member which is coaxially coupled to a driving shaft of said rotary driving source, for transmitting a rotary driving force of said rotary driving source;

a displacement member which surrounds said rotary driving force-transmitting member and which is displaceable along an axial direction of said main actuator body in accordance with an engaging action with said rotary driving force-transmitting member;

a sensor which is used to detect a magnetic field of a permanent magnet displaceable integrally with said displacement member; and a fastening member which is disposed at a side surface portion of said main actuator body and which is used to fasten a lead wire of said sensor, wherein said rotary driving force-transmitting member is composed of a feed screw shaft, and said displacement member is displaceable along said axial direction in accordance with an engaging action effected by a male thread formed on an outer circumference of said feed screw shaft and a female thread formed on an inner circumferential surface of said displacement member.

2. The electric actuator according to claim 1, wherein said driving unit is provided with a brake mechanism for braking rotational force of said driving shaft of said rotary driving source.

3. The electric actuator according to claim 1, wherein a long groove is formed at a side surface portion of said main actuator body, and wherein said sensor is provided at a predetermined portion of said long groove.

4. The electric actuator according to claim 3, wherein said fastening member is used to fasten the lead wire of said sensor with said sensor being arranged along said long groove, is provided at a side surface portion of said main actuator body.

5. The electric actuator according to claim 4, wherein said fastening member is composed of a cover member, said cover member is formed with a first hole communicating with said long groove, a second hole inclined by a predetermined angle from said first hole to the outside, and a lead wire outlet communicating with said second hole, and said lead wire outlet is provided with a sharp fastening tab for fastening said lead wire.

6. The electric actuator according to claim 1, wherein a piston, which is displaceable integrally with said displacement member along a hole of said main actuator body, is provided at one end of said displacement member, and a spline, which effects a rotation-preventive function for said displacement member, is formed on said piston.

7. The electric actuator according to claim 6, wherein a pair of damper members, which are used to restrict an amount of displacement of said displacement member upon abutment of said piston, are arranged in said hole of said main actuator body.

8. The electric actuator according to claim 2, wherein said brake mechanism includes a braking pad for making rotation integrally with said driving shaft of said rotary driving source, a pair of interposing plates for interposing said braking pad in accordance with an action of resilient force of a spring member, and an electromagnetic coil for deenergizing an braking action by attracting one of said interposing plates against said resilient force of said spring member in accordance with application of electric power.

9. The electric actuator according to claim 1, wherein a seal member, which is used to surround an outer circumferential surface of said displacement member so that a hole of said main actuator body is prevented from invasion of dust or the like, is provided at one end of said main actuator body.

10. The electric actuator according to claim 9, wherein said seal member is composed of a rod packing installed to a head cover.

* * * * *